US006990581B1

(12) United States Patent
Rubin

(10) Patent No.: US 6,990,581 B1
(45) Date of Patent: Jan. 24, 2006

(54) BROADBAND CERTIFIED MAIL

(75) Inventor: Aviel D. Rubin, W. Caldwell, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/544,236

(22) Filed: Apr. 7, 2000

(51) Int. Cl.
*H04L 9/32* (2006.01)
*H04M 1/65* (2006.01)

(52) U.S. Cl. .................. 713/170; 370/352; 379/88.17; 379/88.23; 713/168; 713/175; 713/176

(58) Field of Classification Search ............. 379/88.13, 379/88.14, 88.17, 88.19, 88.21, 88.22, 88.23, 379/14, 17, 21–23; 380/28, 30; 370/352; 713/170
See application file for complete search history.

(56) References Cited

U.S. PATENT DOCUMENTS

| | | | | |
|---|---|---|---|---|
| 5,022,080 A | | 6/1991 | Durst et al. ................... 380/23 |
| 5,303,296 A | | 4/1994 | Zucker ......................... 379/67 |
| 5,377,017 A | * | 12/1994 | Lam ........................... 358/405 |
| 5,535,276 A | * | 7/1996 | Ganesan ...................... 713/155 |
| 5,615,268 A | | 3/1997 | Bisbee et al. ................. 380/25 |
| 5,629,982 A | * | 5/1997 | Micali ......................... 380/30 |
| 5,633,916 A | * | 5/1997 | Goldhagen et al. ...... 379/88.17 |
| 5,638,446 A | * | 6/1997 | Rubin .......................... 705/51 |
| 5,717,757 A | | 2/1998 | Micali ......................... 380/25 |
| 5,815,555 A | | 9/1998 | Cairo ...................... 379/93.07 |
| 5,956,390 A | * | 9/1999 | McKibben et al. ...... 379/93.07 |
| 5,960,083 A | | 9/1999 | Micali ......................... 380/23 |
| 5,982,506 A | * | 11/1999 | Kara .......................... 358/405 |
| 6,137,884 A | * | 10/2000 | Micali ......................... 380/30 |
| 6,188,766 B1 | * | 2/2001 | Kocher ....................... 380/246 |
| 6,263,051 B1 | * | 7/2001 | Saylor et al. ............. 379/88.17 |
| 6,327,656 B2 | * | 12/2001 | Zabetian ..................... 713/176 |
| 6,477,243 B1 | * | 11/2002 | Choksi et al. ......... 379/100.06 |

\* cited by examiner

*Primary Examiner*—Gregory Morse
*Assistant Examiner*—Matthew Heneghan

(57) ABSTRACT

The present invention provides a system and method for providing certified voice and/or multimedia mail messages in a broadband signed communication system which uses packetized digital information. Cryptography is used to authenticate a message that has been compiled from streaming voice or multimedia packets. A certificate of the originator's identity and electronic signature authenticates the message. A broadband communication system user may be provisioned for certified voice and/or multimedia mail by registering with a certified mail service provider and thereby receiving certification. The called system user's CPE electronically signs the bits in received communication packets and returns the message with an electronic signature of the called system user to the calling party, along with the system user's certificate obtained from the service provider/certifying authority during registration. The electronic signature is a cryptographic key of the called party.

8 Claims, 4 Drawing Sheets

BROADBAND CERTIFIED MAIL

FIELD OF THE INVENTION

The present invention relates to communication between users in communication systems, and more particularly, to providing certified mail in a communication system including broadband communications.

BACKGROUND OF THE INVENTION

Present day telephony networks, typically have end-to-end networks built around circuit switches, end offices, a toll network, tandem switches, and twisted wires. These networks are commonly referred to as a public switched telephone network (PSTN) or plain old telephone service (POTS). Due to bandwidth limitations of plain old telephone service (POTS), there is an inherent inability to efficiently integrate multiple types of media such as telephony, data communication for personal computers (PC), and television (TV) broadcasts. Further, the type of customer services and feature/function capability that may be implemented in a PSTN is somewhat limited relative to a broadband communication system. Accordingly, new broadband architectures are developing which transmits voice, data, and multimedia (video and audio) communications using, for example, communication information packets. These communication packets may be constructed in one or more packet protocols such as Internet Protocol (IP) or asynchronous Transfer Mode (ATM). These new architectures gives rise to a new array of user services and capabilities not previously available with PSTN. One such new service and system capability of a packet based broadband communication system is provided by the present application for certified mail.

Present PSTN voice mail systems do not readily provide a method that enables a caller to prove that they have left a voice mail or multimedia mail message for the called party, or for proving the content of that voice mail or multimedia mail, i.e., certified mail. Further, present PSTNs voice mail systems do not automatically include the digital representation of the message left that would enable electronic certification of a broadband communication mail message. The present PSTN infrastructure will not support certified mail. However, with the development of packet based broadband communication systems, certified voice and multimedia mail is possible to implement. Certified voice and multimedia mail represents a value to consumers as a means to enable a calling party to prove that they left a message for a called party on the called parties voice and/or multimedia mail system and establish the content of that message.

SUMMARY OF THE INVENTION

The present invention provides a system and method for providing certified mail messages in a broadband communication system which uses packetized information. According to the invention, a broadband communication system user may be provisioned for certified voice and/or multimedia mail by registering with a certified mail service provider and thereby receiving certification including a certificate. The registration process may include the system user's broadband equipment providing a cryptographic public key to the service provider. In one variation, the system user's customer premises equipment and cryptography software will generate a private key (used to electronically sign messages) and a public key (used to verify the electronic signature) for the user. In this case, the system user controls the private key and keeps it secret. In another variation, a service provider/certifying authority may provide the system user a unique public key and private key. In either case, the service provider/certifying authority issues a digital certificate certifying authenticity of the system user's identity and public key. The certificate may include, for example, the user's name and the user's public key, and is signed with the public key of the service provider/certifying authority. Further, the Certifying Authority may choose to include other information in the certificate, such as an expiration time, and the organization that the individual belongs to. The public key of the service provider/certifying authority may be well known so the user and a caller requesting certified mail may open the certificate. For example, it could be built into the customer premises equipment (CPE) of both parties to the call.

Once the broadband communication system user has registered with a service provider for certified voice mail and/or multimedia mail and received the certificate, their CPE, for example a broadband telephone interface (BTI), will be capable of offering certified voice and multimedia mail to a calling party. When a caller communicates with a system user that is registered for certified mail, by for example making a call, he may be given the option of leaving regular voice or multimedia mail or certified voice or multimedia mail. If the certified mail option is active and selected, then the caller and/or the called system user's CPE keeps track of the information packets (e.g. IP voice packets) used in the call. The called system user's CPE may then digitally sign the bits in the communication packets with a cryptographic electronic signature and return the signed message to the calling party, along with the system user's certificate obtained from the service provider/certifying authority during registration. The calling party may then use its copy of the message, a copy of the message signed with the called parties electronic signature, and the certificate, to prove to anyone in possession of the service provider's public key, that he left the particular voice mail or multimedia mail message for the called party. The service provider/certifying authority may be notified and charge a fee each time the certified mail feature is utilized. Therefore, the caller can undeniably prove that the call happened and that the content of the message left was what he claims it to be.

DESCRIPTION OF THE PREFERRED EMBODIMENTS

Figure 1:
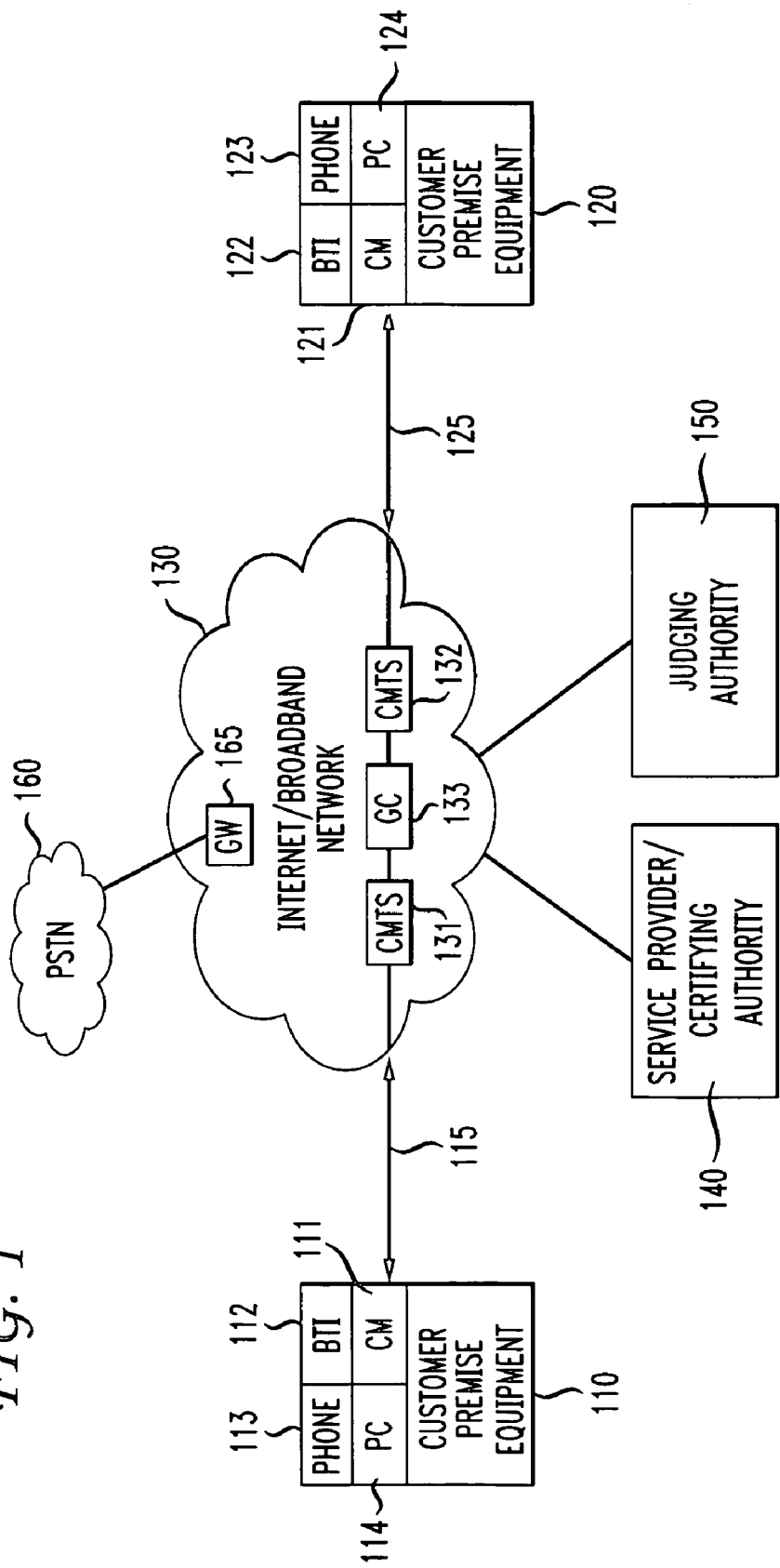
FIG. 1 shows a schematic representation of a broadband network (e.g., broadband IP based network) in accordance with a preferred embodiment of aspects of the present invention.

Certified mail according to the present invention serves purposes similar to "certified mail" offered by the United States Postal Service or any other postal service in that it provides a mechanism by which a person can prove that they had a particular communication with another person. However, the present invention extends the idea of certified mail to all types of electronic communications performed on a broadband communication system. For example, some preferred embodiments of the present invention are directed to certified voice mail and certified multimedia (video and audio) mail.

In general, the present invention provides a mechanism for callers to provide proof that they left a message for a particular party which that party cannot deny. The proof covers the content of the message as well as the fact that the communication was made. As packetized information traffic including, for example, voice and multimedia traffic, begins to be carried on broadband communication systems in digital form as packets, e.g., IP voice or multimedia packets, the number of services and features that can be offered increases. The present invention, referred to herein as broadband communication certified mail, is an example of such a service. Although the following preferred embodiments are directed particularly to certified voice mail, one skilled in the art will recognize that the invention is generally applicable to certifying multimedia mail including voice, video, and/or text messages communicated via a broadband communication system.

To achieve certified mail messages the present invention uses cryptography as a method of authenticating the identity of the recipient of the message and the contents of the message. A system user may subscribe to a service provider/ certifying authority and select a public key which will be use in certifying received voice or multimedia messages. This public key and a system user's related private key may be generated using cryptography software, for example, Pretty Good Privacy (PGP) or S/MIME. Although, the invention is not limited to these particular software packages. The system user may provide the service provider/certifying authority with its public key at the time they subscribe for certified mail service. Alternatively, the service provider/certifying authority may generate and provide the user with a public key and a private key for use in the certification process. In either case, the private key is used to electronically sign any certified mail message which the system user receives and the public key is used to electronically verify the electronic signature. The system user's identification (e.g., name) and public key may be included in a certificate generated by the service provider certifying authority which is electronically signed using the service provider/certifying authority's public key. When a certified mail message is created, an electronically signed copy of the certified mail message and a copy of the certificate are sent to the party who wishes to leave a certified mail message. The electronically signed message and the certificate may be subsequently used to undeniably prove that the party actually left the message and its contents with the person whom they claim to have left the message.

One preferred embodiment of a broadband communication system architecture in which the present invention may be implemented is illustrated in FIG. 1. Although the invention will be describe herein using the broadband communication system illustrated in FIG. 1, it is understood that the invention may be implemented in any number of different broadband communication systems or variations of the broadband communication system illustrated in FIG. 1. Some other possible broadband communication system architectures in which the present invention may be implemented include those shown in, for example, U.S. patent application Ser. No. 09/475,661 now U.S. Pat. No. 6,889, 321 and U.S. patent application Ser. No. 09/475,294 filed Dec. 30, 1999, hereby incorporated by reference for all purposes.

As illustrated in FIG. 1, the broadband communication system may include plurality of customer premise equipment (CPE) 110 and 120 used to interface with a broadband communication system, for example, Internet/broadband network 130. The CPEs 110 and 120 may include, for example, a cable modem (CM) 111 and 121 coupled to the Internet/Broadband Network 130 via a communication interface 115 and 125, respectively. The communication interfaces 115 and 125 may be, for example, a coaxial cable, optical fiber, radio waves, etc, as long as it can handle broadband communications. Further, the CPEs 110 and 120 may include a personal computer (PC) 114 and 124, a broadband telephone interface (BTI) 112 and 122, and a telephone, 113 and 123. The cable modem 111 (or 121) and the broadband telephone interface 112 (or 122), may be separate or integral in a single box such as a broadband residential gateway (BRG), and may further include a television interface. Likewise, the CM 111 (or 121) and/or BTI 112 (or 122) may be included in the PC 114 (or 124).

The CPE 110 and 120 may further include a means for generating cryptographic keys such as cryptography software, for example, Pretty Good Privacy (PGP). The means for generating cryptographic keys may be contained in any of the CPE 110 and 120, for example in the PC 114 and 124 or in the BTI 112 and 122. Further, the means for generating cryptographic key may include both hardware and software or may reside somewhere else in the broadband communication system. In any case, the cryptographic keys may include both private and public keys and will provide electronic signature and verification means for certified mail. The private key may be a first algorithm that encodes the voice mail or multimedia mail message and the public key may be a second algorithm, related to the first algorithm, that decodes the voice mail or multimedia mail message so that the original message can be recaptured from the signed message.

The Internet/broadband network 130 may include a plurality of cable modem termination systems (CMTS) 131 and 132 to couple to the plurality of cable modems (e.g., CMs 111 and 121) coupled to the broadband communication system and one or more gate controllers 133 to coordinate communication traffic throughout the broadband system. The Internet/broadband network 130 may be coupled to a PSTN 160 via a gateway (GW) 165. Further, the broadband communication system may include a service provider/ certifying authority 140 coupled to the Internet/broadband network 130 which provides the certified mail feature according to the present invention. The service provider/ certifying agent 140 may include a server and appropriate software to operate the certified mail feature of the present invention, and may be located anywhere in the broadband communication system. The service provider/certifying agent 140 may include a means for placing an electronic signature on a certificate that certifies a subscriber's identity and public key, for example cryptography software such as PGP. Finally, the broadband communication system may include a judging authority 150 coupled to the Internet/ broadband network 130 which may provide a forum for validating the authenticity of a certified mail message according to the present invention. The judging authority 150 may include a server and appropriate software to operate the certified mail feature of the present invention, and may be located anywhere in the broadband communication system.

Figure 2:
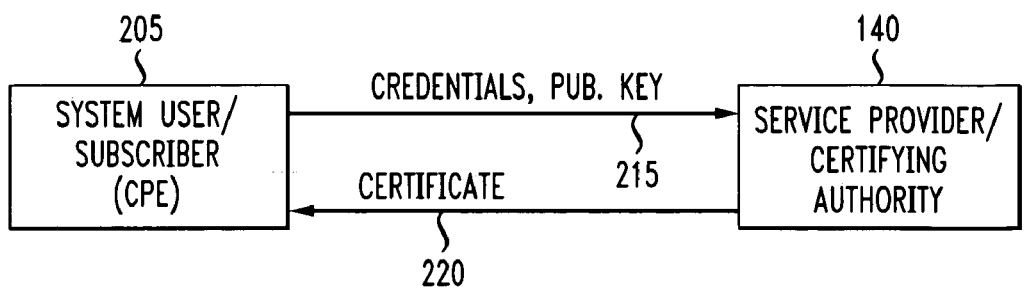
FIG. 2 shows an information flow diagram for registration of a system user according to a preferred embodiment of the present invention.

Any broadband communication system user/subscriber who wants to provide certified voice mail or multimedia mail to callers may register or subscribe for the service with the service provider/certifying authority 140. Referring to FIG. 2, in a first embodiment the system user/subscriber 205 enters into a registration process in which the user provides credentials and a cryptographic public key (215) to the service provider/certifying authority 140. The credentials may include the users identity (e.g., name), directory number, address (geographical and/or system address (e.g. IP address)), etc., so that the service provider/certifying authority 140 may issue a certificate (220) which properly identifies the system user/subscriber 205. As indicated in the figures, the system user/subscriber may send their credentials and public key stored on their BTI 112 or PC 114 using, for example, the PC 114 or telephone 113, transmitted via the Internet/broadband network 130, to the service provider/certifying authority 140. The system user/subscriber 205 may generate, store, and control the private key and keep it secret using the CPE 110. The service provider/certifying authority 140 issues a digital certificate 220 which may include the system user/subscriber's 205 credentials and public key, and is electronically signed by the service provider/certifying authority 140 public key. The service provider 140 may also provisions the subscribers 205 CPE 110 to enable use of the certified mail feature. This provisioning may be performed when the system user subscribers for service. For example, the service provider/certifying authority 140 may, for example, separately transmit software that enables the subscriber's CPE 110 to operate the certified voice mail and multimedia mail message feature. This software may include cryptography software. Alternatively, the certificate 220 may include a program that automatically upon receipt enables the CPE 110 to operate the certified mail feature or the service provider 140.

In a further embodiment of the invention, the public key of the service provider/certifying authority 140 may be well known to other system users so that the various recipients of the certificate can open the certificate and verify its contents. For example, it could be built into the subscriber's customer premises equipment (CPE). Alternatively, the public key of the service provider/certifying authority 140 may be sent to the various system users upon request.

Figure 3:
FIG. 3 shows an information flow diagram of broadcasting a system user's public key according to a preferred embodiment of the present invention.

The system user/subscriber 205 then may use his CPE 110 to publish his certified mail public key issue by the service provider/certifying authority 140 so that the rest of the world, e.g., Internet/broadband network subscribers, knows his public key and can verify a certified mail message left for the system user/subscriber 205. As illustrated in FIG. 3, the system user/subscriber 205 broadcasts his certified mail public key to the rest of the world (310), e.g., Internet/broadband network 130 subscribers. This broadcast may occur in advance of the creation of a certified mail message. Alternatively, the system user/subscriber 205 may transmit his public key at the time a certified mail message is sent and/or at the time they subscribe for the certified mail feature.

Once the broadband system user has registered with a certified mail service provider and has received his certification (and if necessary software), the system user may activate or deactivate the certified voice mail and multimedia mail message feature by, for example, entering a particular code into the telephone 113 or selecting an icon on the PC 114. If the certified mail feature is activated then a telephone caller or a multimedia caller will be provided the option of leaving a certified mail message. One example of an embodiment illustrating the operation of certified voice mail is described below. However, one skilled in the art would understand that the an alternative embodiment of the invention directed to certified multimedia mail is easily achieved by slight modification and the details of such a procedure are thus not included herein.

Figure 4:
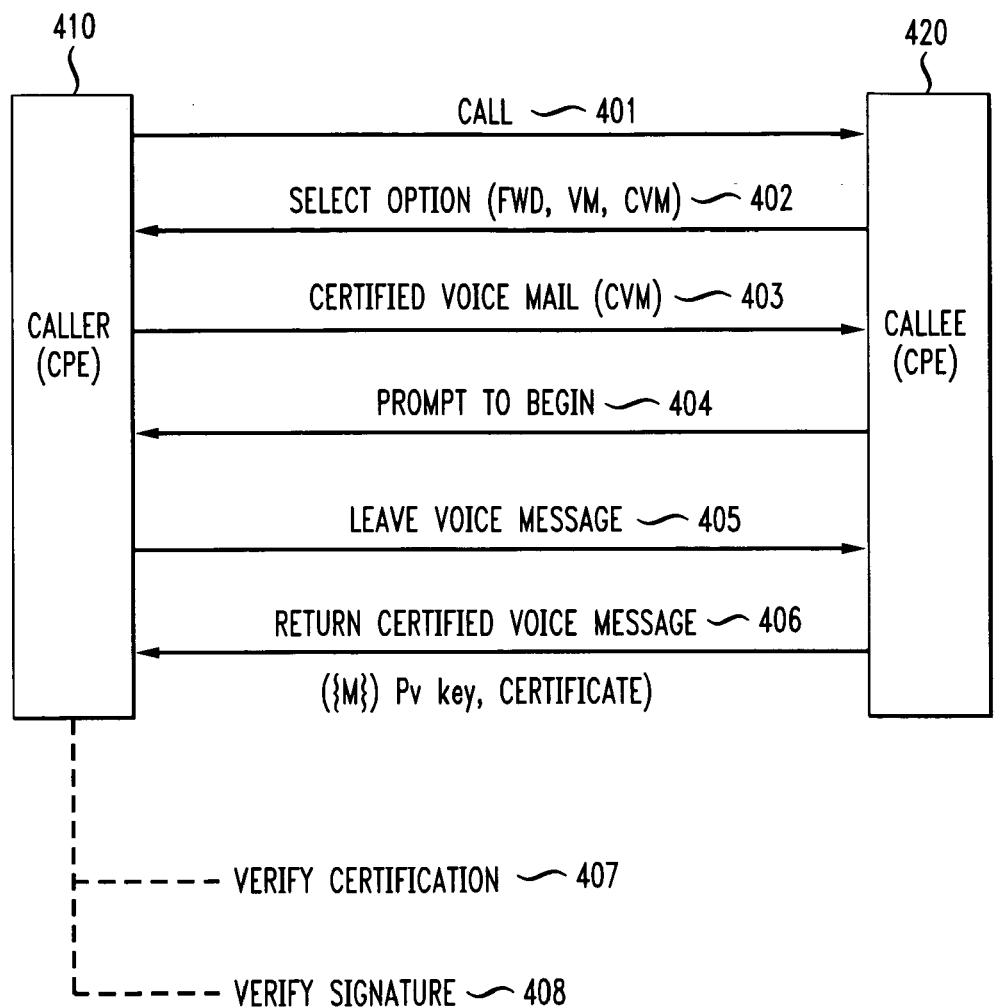
FIG. 4 shows an information flow diagram of certifying a voice mail message according to a preferred embodiment of the present invention.

Referring now to FIG. 4, the procedure for certified voice mail according to one embodiment of the invention is illustrated. First, a caller 410 places a call 401 to a callee 420 through respective CPEs (i.e., a CPE of a system user/subscriber who has registered for certified mail or who has the necessary cryptographic software) by dialing, for example, a telephone directory number or a system address. The call is carried over a broadband communication system using packetized information, for example, IP, such as the system illustrated in FIG. 1. The call might be placed with phone 113 to phone 123 via the respective BTIs and CMs through the Internet/broadband network 130 or via multimedia PCs 114 and 124. Next, the callee's CPE 420 presents a menu of options to the caller 410 with a request to select an option 402. The options may include, for example, (1) leave a message (e.g., voice mail (VM)), (2) forward to another phone (FWD), and (3) leave a certified mail message (e.g., certified voice mail (CVM)) and may be a computer generated or voice recorded message. The select option message may be retained in the callee's CPE or within a centralized system in the Internet/broadband network 130. In any case, if the caller 410 chooses to leave a certified mail message by entering an appropriate response, e.g., selecting 3, his CPE sends a response indicating a selection of certified voice mail 403 to the callee's CPE 420 via the broadband communication system.

Then, the callee's CPE 420 indicates to go ahead by sending the caller 410 a prompt to begin 404, e.g., sending a beep sound. The caller 410 may then leave a voice message 405. The voice message, being transmitted in a packet based (e.g., IP) broadband communication system, will be digitized and packetized by the caller's CPE and sent to the callee 420 over, for example, Internet/broadband network 130. In one alternative, the caller's 410 CPE may retain a copy of the message packets being transmitted and recorded as a certified mail message. Next, the callee's CPE 420 receives the stream of digitized and packetized voice message packets (i.e., digital voice data) as the caller 420 leaves a voice message 405. Then the callee's CPE 420 may package the related message packets together so as to return them to the caller 420 as part of a return certified voice message 406. In one preferred embodiment, the related message packets may be combined and all headers removed so only voice message information data is left. Alternatively, each of the message packets may be electronically signed and sent to the caller's 410 CPE 110.

In any case, without converting the voice mail message contents to analog, the combined message packets may then be electronically signed using the callee's 420 private key, designated herein as $\{M\}_{Pv\ key}$. The signed message $\{M\}_{Pv\ key}$ is returned to the caller 410, along with the certificate 220 from the service provider/certifying authority 140, as returned certified voice message 406. The signed message $\{M\}^{Pv\ key}$ and certificate 220 may be saved to memory in the caller's CPE 410 or may be transmitted to a central network service center for storage until needed if a dispute over whether the message was ever left with the callee 420 ever arises. Subsequently, the caller 410 may verify the certification 407 of the certificate 220.

To verify the certification the caller 410 would open the certificate 220 using the service provider/certifying authority's 140 public key and confirm that the callee's 420 credentials stored therein are correct and a public key for the callee 420 was included. Further, the caller 410 would verify the electronic signature of the coded message received by opening the message with the callee's 420 public key. If the resultant message matches the original message left for the callee 420, then the verification is complete and the caller 410 has successfully left a certified mail message for callee 420. Therefore, the caller 410 will have verified the certification from the service provider/certifying authority 140 and the callee's 420 signature on the message 408.

In another preferred embodiment, the service provider/certifying authority 140 may be notified by, for example a message from the callee's 420 CPE 110, and the service provider/certifying authority 140 may charge the callee 420 a fee. This fee for service may occur each time the certified mail feature is utilized, or there could be a subscription for service.

In one variation of the invention, the system may facilitate certified voice mail for a voice mail message left by a caller using an off network telephone, for example a POTS telephone or a cell phone originating from, for example, the PSTN 160. In this case, since the caller will not integrally connected with their own PC 114 or BTI 112 at their customer premises, the system will be constructed and operate so that the signed message packet and certificate are stored at a location which may be designated by the caller. For example, the caller may choose to store the signed message packet(s) and certificate transmitted by the callee's 420 CPE 120 at their own CPE 110, the service provider/certifying agent 140, at the judging authority 150, or at some other party location on or off the network. The system may automatically determine that the call is originating from an off network telephone by determining that packets are originating from a bridging gateway (GW) 165 and prompt the caller to enter their desired certified mail storage destination by entering, for example, a system name or address, or selecting from a menu of choices. The caller can enter the destination information by, for example, pressing the keypad on a POTS telephone or cell phone or by responding verbally and having a voice recognition system determine the caller's response. As long as the callee 420 is on a packet based network such as an IP network, at the gateway 165 from the PSTN 160 to the Internet/broadband network, the call will be digitized and packetized. When the voice packets reach the callee's 420 CPE 120, the callee's 420 CPE 120 may sign the digital voice data packets the same way as describe in the above embodiments. The difference in this embodiment is that the signed certified message packet(s) and certificate 220 must now reach an alternative destination, not the gateway 165, such as the caller's CPE 120, because the off network communication device, for example a telephone, is not equipped to verify and store the certified mail information. Therefore, by the caller entering, for example, a code into the off network telephone indicating the alternative certified mail storage location, for example their BTI 112, the callee's 420 CPE 120 can send the signed message packet(s) and certificate 220 to the selected location after the call and message is completed. The callee's 420 CPE 120 could also use caller ID information to route the signed data to a known or predetermined destination previously entered into the system, thus eliminating the requirement that the user enter a code at the time a certified mail message is created.

Figure 5:
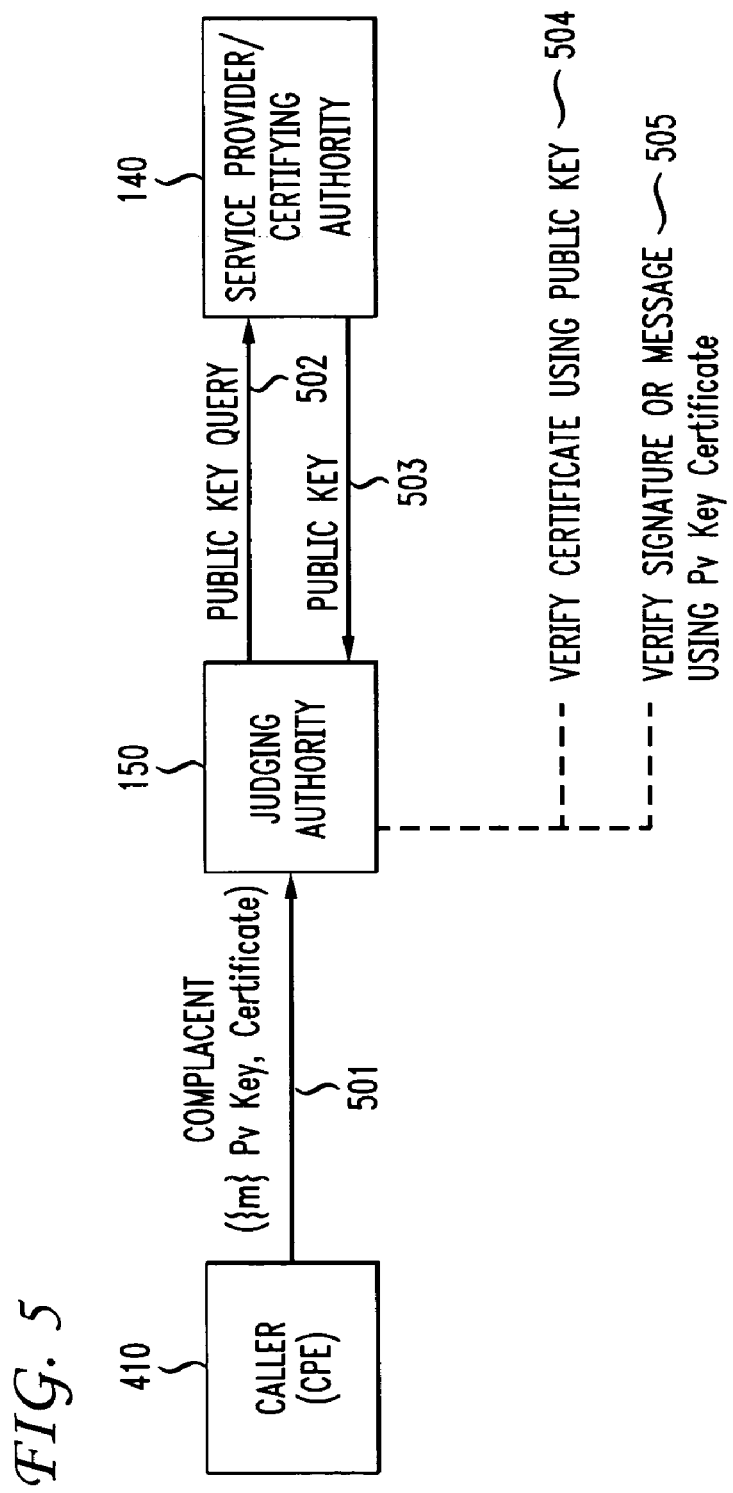
FIG. 5 shows an information flow diagram of dispute resolution of a certified voice mail message according to a preferred embodiment of the present invention.

If there is ever a dispute as to whether the caller 410 left the callee 420 a particular voice mail message, the caller may a dispute resolution process by submitting the certified voice mail message $\{M\}_{P_v\ key}$ and certificate to a judging authority 150 so that message authentication and content can be verified. Referring to FIG. 5, the certified mail message dispute resolution process begins with the caller 410 sending a complaint 501 including the signed message $\{M\}_{P_v\ key}$ and certificate 220 from received from the callee 420 to a judging authority 150. This information may be transmitted to the judging authority 150 via the Internet/broadband network 130. The judging authority 150 may then send a public key query 502 to the service provider/certifying authority 140, asking for its public key. Next, the service provider/certifying authority 140 sends its public key 503 to the judging authority 150. However, if the judging authority 150 is a subscriber of the service provider/certifying authority 140, it may already have the service provider/certifying authority's 140 public key. In either case, then, the judging authority verifies (step 504) the certificate 220 by opening the certificate using the service provider/certifying authority's 140 public key 503. Then, the judging authority 150 verifies the signed message $\{M\}_{P_v\ key}$ by recovering the original message from the encoded message using the callee's 420 public key included in the certificate 220 (step 505). Next, the judging authority 150 issues his ruling based on the success or failure of the verification. If the digital representation of the decoded message matches the digital representation of the original message, than the judging authority 150 verifies the authenticity of the message and the identity of the recipient. The judging authority 150 may uses the same signing and verification software used by the caller 410 and the callee 420.

Although particular embodiments of the present invention have been shown and described, it will be understood that it is not intended to limit the invention to the preferred embodiments and it will be obvious to those skilled in the art that various changes and modifications may be made without departing from the spirit and scope of the present invention. Thus, the invention is intended to cover alternatives, modifications, and equivalents, which may be included within the spirit and scope of the invention as defined by the claims. For example, the present invention is applicable to any broadband communication system in which cryptography may be used to establish authentication and certification of mail messages transmitted in digital packet formats, such as asynchronous transfer mode (ATM) or Internet Protocol (IP) based broadband communication systems. Further, the present invention may be used to certify all types of electronic mail including voice, text, and multimedia. In addition, the certified mail feature of the present invention may be implemented using software and/or hardware located anywhere within a broadband communication system, for example, in customer premises equipment (CPU) such as a PC, BTI, or BRG, in a service provider/certifying authority server, in a judging authority server, or in a central services server located anywhere within the broadband communication system.

All publications, patents, and patent applications cited herein are hereby incorporated by reference in their entirety for all purposes.

What is claimed is:

1. A method for certifying electronic messages in a broadband communication system, comprising the steps of:
    attaching by a recipient an electronic signature including a cryptography key to a voice mail message comprising a compiled string of digitized voice information packets to indicate that the recipient received said mail message;
    sending said voice mail message with said electronic signature from the recipient to a calling party who sent said digitized information packets; and
    sending a certificate to said calling party who sent said digitized information packets certifying the identity of said recipient who received said voice mail message.

2. The method according to claim 1, further comprising the steps of:
    generating said certificate; and
    sending said certificate from a certification provider to said message recipient.

3. The method according to claim 2, further comprising the steps of:
    sending said mail message with said electronic signature and said certificate from said party who sent said digitized information packets to a judge; and
    judging the authenticity of said mail message.

4. The method according to claim 3, further comprising the step of:
    verifying said certificate is authentic by using a cryptography key of said certification provider.

5. The method according to claim 1, further comprising the step of:
    verifying said electronic signature is authentic by using a cryptography key contained in said certificate.

6. The method according to claim 1, further comprising the step of:
    prompting said party who sent said digitized information packets to select an option including leaving a certified mail message.

7. The method according to claim 6, further comprising the steps of:
    verifying said certificate by said party who sent said digitized information packets; and
    verifying said electronic signature of said recipient by said party who sent said digitized information packets.

8. The method according to claim 1, wherein said electronic signature is cryptography key of said recipient.

* * * * *